FIG.1

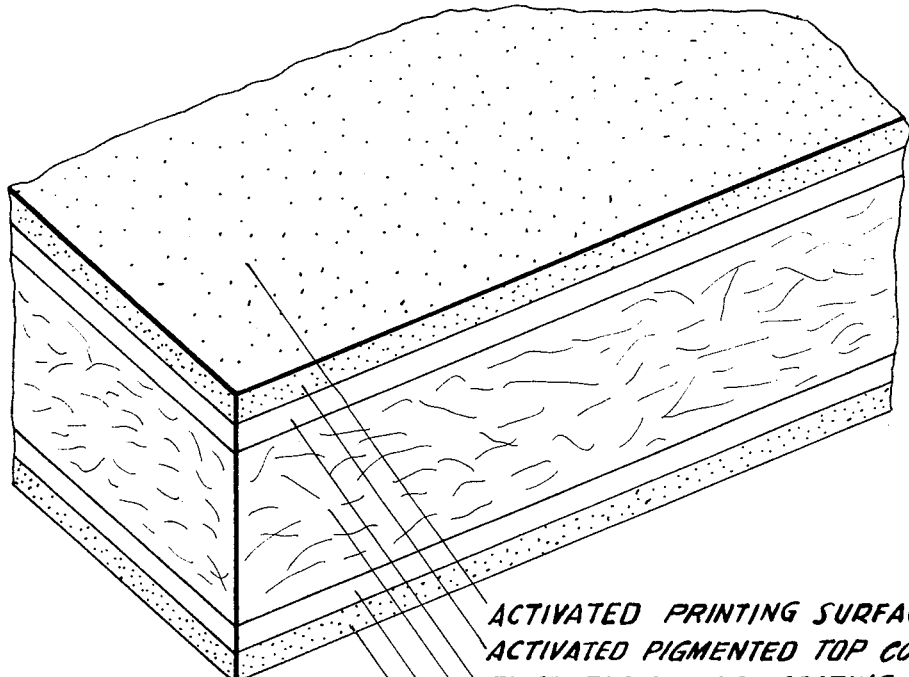

- ACTIVATED PRINTING SURFACE
- ACTIVATED PIGMENTED TOP COATING
- FIRST PIGMENTED COATING
- FIBROUS CELLULOSIC PAPER
- FIRST PIGMENTED COATING
- ACTIVATED PIGMENTED TOP COATING

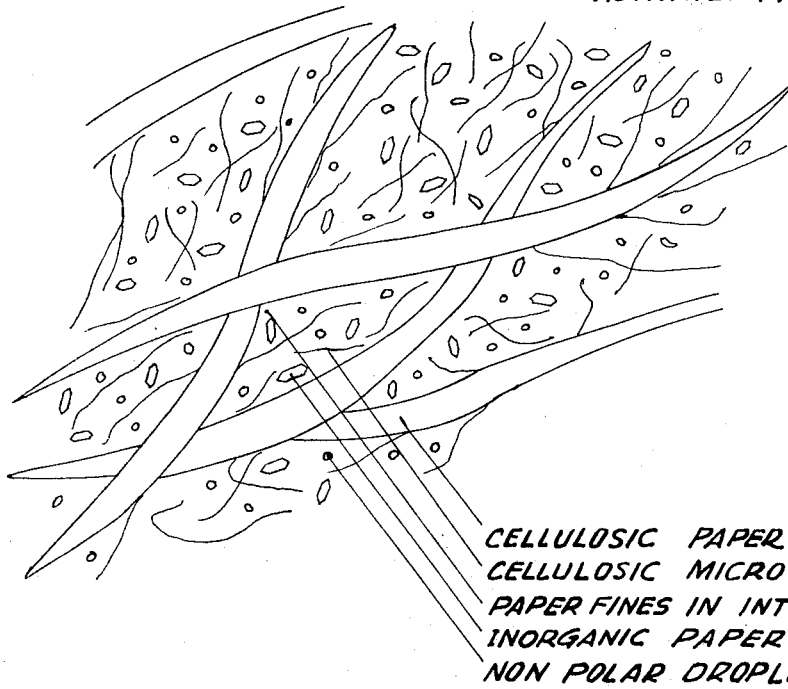

FIG.2

- CELLULOSIC PAPER FIBER
- CELLULOSIC MICRO FIBRIL
- PAPER FINES IN INTERSTICES
- INORGANIC PAPER FILLER
- NON POLAR DROPLET CONTAINING METAL ORGANIC SALT

INVENTOR.
PAUL GOTTFRIED BLEIER
BY
McGlew & Toren
ATTORNEYS

United States Patent Office 3,711,317
Patented Jan. 16, 1973

3,711,317
PRINTABLE PAPER MATERIAL AND
METHOD OF MAKING
Paul Gottfried Bleier, Vienna, Austria, assignor to
Samum Vereinigte Papier-Industrie K.G., Vienna,
Austria
Filed Dec. 22, 1969, Ser. No. 886,956
Claims priority, application Austria, Feb. 25, 1969,
A 1,897/69
Int. Cl. D21h 1/10; B32b 29/06
U.S. Cl. 117—76 P    9 Claims

ABSTRACT OF THE DISCLOSURE

Printable material, such as paper, is imparted with improved printability by providing thereon catalytic substances, e.g. metal salts of higher organic acids or normally stable peroxides. In accordance with the invention, these substances are provided in finely dispersed form as distinguished from continuous films. In respect to coated papers, such as pigment coated papers, the catalytic substance is incorporated in the coating in dispersed form, advantageously in the form of an oily dispersion. In respect to uncoated papers, the substance may be incorporated in the paper mass proper, also in finely dispersed form.

FIELD OF INVENTION

The invention relates to printable material, such as paper, cardboard, carton, foils and the like (hereinafter collectively sometimes referred to as printable material) irrespective of the form in which the material is supplied, wherein the printability of the material is enhanced by substances which promote chemical drying of printing ink.

BACKGROUND INFORMATION AND PRIOR ART

In all printing, as for example relief printing, flat or surface printing, and intaglio printing, by any known printing processes and on any printing machine, the printing ink has first to be evenly distributed in liquid form on a transfer means, such as a plate, block or cylinder, from which the ink is then applied to the paper or other printable material. After the printing process has been performed, the transferred impression has to be converted into a stable, solid and permanent film exhibiting good adhesiveness relative to the printable material. Even when printing inks of high fluidity are used, their rapid conversion into solid form is a prerequisite for hgh speed modern printing processes. While solidification or drying of the printing ink takes place, a number of physical and chemical phenomena occur. The subject matter of the present invention is concerned with the chemical phenomena.

It has so far not been fully possible to explain the chemical phenomena that actually occur during the drying of printing ink. It is, however, generally assumed that essentially an oxidative cross-linking takes place, such as it is known to occur with certain unsaturated drying oils and resins. This oxidative cross-linking is utilized in varnish drying and paint applications. The reactions that take place are influenced by the choice of different drying and non-drying oils and resins and by the addition of catalysts, e.g. accelerators, siccatives and the like.

One of the difficulties encountered in formulating printing ink systems is to choose the components in such a manner that on the one hand, a rapid and complete solidification and hardening is assured, while, on the other hand, any reaction will be inhibited up to the moment, when the printing ink contacts the paper or other printable material. The time when the printing ink is exposed to air-oxygen on the transfer mechanism of the printing machine, is the latest moment at which acute danger of incipient chemical drying exists. To prevent such premature drying, reaction inhibitors have sometimes been incorporated in the ink. This, however, may in turn inhibit the desired subsequent cross-linking of the ink on the paper.

With a view to accelerating the drying of the printing ink after its transfer to a printable material, it is necessary, at the present state of the art, to add to the printing ink catalysts in the nature of accelerators and/or siccatives (hereinafter referred to as catalysts) which promote the oxidative cross-linking of certain printing ink components.

In addition to incorporating such catalysts into the printing inks, it has previously been proposed to provide the catalysts in a continuous film which forms a cover layer on the printable material proper. U.S. Pat. 1,811,-804 is thus concerned with the production of decalcomania material, wherein the printability of the water swellable transfer layer of the material is improved by placing above the swellable transfer layer a thin coating or layer of a protective lacquer. This coating or layer is in the form of a continuous film, which is as free of pores as possible and which is formed from nitrocellulose and siccatives dissolved in an organic solvent. Small amounts of fillers may be incorporated within the film structure, with a view to forming a fine surface roughness.

Reference is also had to U.S. Pat. 3,029,154 which discloses the coating of uncoated paper with a continuous water repellent film of catalysts in the form of metalorganic siccatives, as for example zinc stearate, aluminum stearate, copper oleate or cobalt resinates in the form of cobalt salts of abietic acid. The general nature of the metalorganic siccatives or catalysts in the form of metallic salts of higher fatty acids is disclosed in column 1 of the 3,029,154 patent. According to the teachings of this patent, presence of the catalytic film accelerates the solidification of the printing ink system and improves the printing quality. The patent in question expressly sets forth that the presence of larger amounts of fillers of mineral nature, as for example clay, effectively inhibits the drying function of the film due to the incompatibility of such fillers with the catalysts in question. The patent thus states in column 1 that the metallic salts in question are not permitted to be mixed and should not contain any excessive quantities of incompatible ingredients, such as clay or other fillers. Moreover, it is a prerequisite for a successful performance of the procedure disclosed in the prior patent, that the printing ink contains a solvent of the metallic salt or salts forming the coating or layer, the solvent being a vegetable or mineral oil, an oxidized oil or a hydrocarbon.

SUMMARY OF THE INVENTION

It is the primary object of this invention to provide a printable material, such as paper and the like, of improved printability which overcomes the disadvantages of the prior art constructions.

Another object of the present invention is to provide a printable material of the indicated kind which may be coated material, such as pigment coated paper, and which, in spite of the presence of clay or the like mineral materials, may utilize known catalysts in an effective manner to result in a printable material of superior printability.

Generally, it is an object of the invention to improve on the art of promoting printability of printable material.

Briefly, and in accordance with the invention, it has been ascertained that the beneficial effect of catalysts in promoting the chemical drying of printing inks is not impeded by the presence of mineral materials, such as clay, provided the catalysts are available on the surface of the material to be printed in finely dispersed form, as distinguished from a prior art continuous film.

Accordingly, and conforming to one embodiment of the invention, the catalysts may be incorporated into clay containing coating masses which are used for coating printable material such as papers. The presence of the catalysts in finely dispersed form causes a more rapid and effective drying of the printing ink and results in an improved solidification of the printing ink film on the printed material.

According to a second embodiment of the invention, which is particularly suitable for the printing of uncoated papers, the catalysts may be incorporated into the carrier e.g. paper mass proper, in which event the catalysts become fixed on the paper fibres and no extraneous surface coating prior to printing is necessary.

Essentially, therefore, the basic thought underlying this invention is to incorporate catalytic substances, which have a tendency to promote or facilitate cross-linking of printing ink components and which, according to the prior art, were contained in a separate cover film, directly into the paper or coating mass in finely dispersed form.

The invention thus is concerned with printable material such as paper, carton, cardboard, foils and the like, wherein the printability of the material is enhanced or promoted due to more rapid drying of the printing ink, this beneficial effect being obtained by the presence of a catalytic substance on the surface to be printed which substance promotes the drying of the applied printing ink, the substance being provided in finely dispersed form, either in the carrier mass proper or in a pigment coating superimposed on the carrier mass.

The catalysts, in accordance with the invention, may be the same as disclosed in U.S. Pat. 3,029,154 or other drying promoting catalysts known to the art. Particularly suitable catalysts are metal salts of higher organic acids wherein the metal is cobalt, manganese or zirconium. The acid moiety of the salt may be octoic acid or naphthenic acid but other higher organic acids are also suitable.

However, it has also been found that excellent results are obtained if the catalysts are substances which release active oxygen. Such substances are, for example, normally stable inorganic or organic peroxides. The following suitable peroxides are mentioned by way of examples.

Inorganic peroxides (1) Barium peroxide, $BaO_2 \cdot 8H_2O$ (active oxygen content 8%)
(2) Zinc peroxide, $ZnO_2 \cdot \frac{1}{2}H_2O$ (active oxygen content 8%)
(3) Sodium perborate, $NaBO_2H_2O_2 \cdot 3H_2O$ (active oxygen content 10%)
(4) Peroxidic Satin White This technical product may be prepared by the usual Satin White preparation method (i.e. with calcium hydroxide and aluminum sulfate) in the presence of hydrogen peroxide (active oxygen content 1%).

Organic peroxides (1) Dilauroyl peroxide $(C_{12}H_{23}O)_2O_2$
(2) Dibenzoyl peroxide $(C_7H_5O)_2O_2$ In order to be effective for the intended purpose, it will be appreciated that the amount of catalyst to be supplied to the printable material may vary within relatively wide limit values. It has been found that excellent results are obtained if the printable material contains the following quantities of catalyst:

(a) If the catalyst is an organic metal salt (expressed as p.p.m. of the active metal): about 1–100 p.p.m.;
(b) If the catalyst is in inorganic peroxide: about 0.1–5% by weight;
(c) If the catalyst is an organic peroxide: about 1–100 p.p.m.

Although, as previously stated, the invention is applicable to both coated and uncoated materials, the primary use of the invention is with coated materials such as pigment coated paper, since printing processes are primarily carried out on the latter type of material. For this reason the following description is primarily directed to paper which is imparted with a pigmented coating.

It is generally known in this art that the production of high quality prints requires the use of paper, cardboard and foils with pigmented coatings. The use of printable materials with pigmented coatings also simplifies and accelerates the printing procedure. The reason that high quality prints require printable materials with pigmented coatings is primarily based on the fact that the major components of the pigmented coatings, as for example clay, precipitated chalk, Satin White and the like have a particle size which is considerably smaller than that of the paper fibres. It follows that by pigment-coating paper or similar printable material, a smooth and homogeneous surface can be obtained having a finely porous structure which in turn is a precondition for the production of high quality prints.

In accordance with one embodiment of the invention, the catalysts are advantageously incorporated into the pigmented coating in the form of a dispersion forming an extraneous phase. For this purpose the catalysts are added in the form of an oily dispersion to the aqueous pigment coating mass or mix. The catalyst particles are finely distributed in the aqueous pigment coating mass by means of surface activity which may be enhanced by the addition of surface active substances. A wide variety of surface active compounds may be used for this purpose. In practice, surface active or wetting agents of the following type have proved to be suitable:

(a) Nonionic wetting agents:
Condensation products with ethylene oxide of different chain length.
(b) Anionic wetting agents:
Sulfonates like dodecylbenzenesulfonate, sulfonated castor oil, sulfonated olefinic hydrocarbons.

This dispersion, while maintaining its catalytic activity, is stabilized by means of protective colloids and fixed in the forming capillary system during the drying of the coating on the paper base. The activation of the catalysts is delayed and is triggered by the contact or wetting with the oily printing ink components, whereupon the catalysts are released from their local fixation. Once the catalytic activity has been initiated, the catalysts exert a strong drying action, particularly due to their fine distribution, and this catalytic action is very rapid and effective and promotes the drying of the drying oils and resins of the printing ink.

Due to the invention, it has thus for the first time become possible further to increase the most favorable physical preconditions for satisfactory printability of pigment coated printable mtaerials by chemical activation of the material.

In conventional prior art pigment coated papers, the first stage of the printing ink solidification consists in the rapid filtering of the somewhat liquid printing ink components. The drying-active papers produced in accordance with the invention supplement this first stage by the likewise rapidly occurring chemical cross-linking (gelling) of the drying oils and resins contained in the printing ink. Due to this chemical cross-linking, the fresh printing ink film is solidified extremely rapidly and within a time period which is much less than has been hitherto the case. Those components of the printing ink system which facilitate solidification and impart gloss are fixed at the location of their greatest activity. This means that the printer can arrange the printed material in high stacks and may immediately fold back the printed material for reprinting.

In rapid multi-sheet printing, it has hitherto been the general practice to dust the individual printed sheets in the printing machine, in order to separate consecutive sheets still moist from the printing to prevent a rubbing-off when the papers are stacked.

By using a printable material according to the invention, dusting may be dispensed with. This is a desirable improvement since dusting impairs the quality of the material and particularly the rubbing-off or abrasion resistance. Prints produced on material of the present invention has improved rubbing-off or abrasion resistance as has been ascertained by scientifically conducted tests. The reason for the fact that the rubbing-off or abrasion resistance of the prints on the inventive printable materials is superior to that of prior art prints produced on conventional material, is due to the fact that a very tough, mechanically stable and well adhering printing ink film is formed on the printed surface. This improved abrasion resistance is of considerable and decisive importance, particularly in respect to printed wrapping or packing material, such as printed pigment coated folding cartons and boxes and the like.

As previously stated, the catalytic activation of the pigment coating need not be effected by metallic salts of organic acids which act as cross-linking catalysts, but equally successful results are obtained by the use of oxygen-releasing agents such as normally stable peroxides. These peroxides supply to the cross-linkable color components the oxygen which is necessary for the cross-linking, in concentrated and effective form.

The invention will now be more fully described in a number of examples which are given by way of illustration and not of limitation. Many changes in the details may be made without departing from the spirit of the invention.

EXAMPLE 1

For producing high grade coated art papers with built-in drying acceleration, to be used with letter press and offset printing inks, the drying promoting agent or catalyst is added to the prepared coating mass or mix for the surface application in the form of cobalt octoate, the cobalt salt of 2-ethylhexanoic acid.

Base paper free of mechanical wood fibres and weighing 75 g./m.$^2$ is coated with an aqueous coating mix of 40–50% solid ingredients on both sides to a final dry weight of 100 g./m.$^2$ on a smoothing roll coating machine. The coating mix consists, as far as pigments are concerned, of about equal parts of calcium carbonate, satin white, and English china clay, and as to binders of about equal parts of sodium caseinate and a copolymer of acrylate and polyvinylacetate (trade name Acronal marketed by BASF). The coated paper web is then once more passed through a smoothing roller coating machine, where a top coating is applied in an amount of 10 g./m.$^2$ on each side. The mix used for the top coat is of the same composition as indicated above with the same solid contents; however, cobalt octoate was added to the coating mix in the amount of 0.005% of cobalt, calculated on the solids of the mix. By first diluting the cobalt octoate with the tenfold amount of commercial isopropyl alcohol, a homogeneous distribution of the active agent is accomplished. By incorporating the cobalt octoate, which is dissolved in an oily phase, under vigorous stirring into the aqueous coating mix, the former separates into extremely fine particles. Coalescence of the particles is prevented by the binders which are present in the mix and which also act as protective colloids. In the above case, the active top coating dried completely within 7 seconds; at this drying rate, a migration of the oily droplets into the upper strata of the top coating may be assumed, that is to say, the droplets are spaced not more than a few microns from the surface. The coated paper is calendered on a 16 roller or bowl calender with a linear pressure of 160 kg./cm., and is cut into sheets. The admixture of additional surface active agents was not necessary in this example.

Such sheets were printed in a printing shop at an hourly output of 4,000–4,500 sheets with half-tone etching using a screen with 60 dots/linear centimeter; printing was done on both sides in single color (black) with a commercial, pure printing ink as it comes out of the can. For comparison, a commercial high-grade art paper, grade enamel No. 1, having the same substance, was printed in the same manner. The prints made with the papers activated by addition of cobalt octoate did not exhibit off-setting, to wit, rubbing off, and had superior abrasion resistance, and the staple or stack could be folded back immediately. No dusting was necessary. Contrary thereto, light dusting was required when work was done with the commercial papers. Both rubbing-off time (wiping resistance immediately after printing) and complete drying (nail test after 5 and 24 hours) were found improved. In the test a slow drying, inexpensive job printing ink was intentionally used.

The improved drying characteristics of the catalyst-treated art paper was established as follows: The paper was run in an offset four color sheet printing press without using any dusting. Immediately after a stack of 1000 sheets had been formed, which took about 12 minutes, the stack was removed from the press. For testing, the printer tried to rub away the drying printing ink film and estimated the pressure of his finger tips he required to do so. The stack was then beaten heavily with a heavy wooden club. Then the back side of the sheets was inspected below the spot where the stack had been hit in order to see whether any offsetting had taken place due to the force by which the fresh ink film had been pressed onto the back side of the overlaying sheet.

The first test showed that the cobalt treated printing papers had achieved a state of dryness after about 3 minutes which was reached by the untreated papers after about 15 minutes only.

The second method of testing indicated that no off-setting whatsoever had taken place in the stack containing cobalt treated papers. The back side of the printed papers of the untreated stack showed a clear offsetting of ink and also, on separating the different sheets of the stack, one could hear a sound typical for the separation of sticky materials.

One week after the printing, a comparison test in respect to the abrasion resistance of the prints was carried out. The printed papers, to wit, both the cobalt octoate treated printed paper and the printed commercial paper were subjected to abrasion in a conventional abrasion testing apparatus for three minutes and at a load of 1 kp. and a rotation speed of about 500 r.p.m. The test indicated a considerably higher abrasion resistance of the prints on the cobalt activated paper of the invention as compared to the abrasion resistance of the prints on the commercial paper.

EXAMPLE 2

An activated coating mix is made by mechanically kneading manganese naphthenate (or octoate) into a pigment mix containing 65% of solids and in the presence of a nonionic wetting agent. The wetting agent is a product known under the trade name LISAPOL NXP marketed by I.C.I. England. LISAPOL NXP is a condensation product of ethyleneoxide with nonylphenol. The pigment mix consists of 75% of kaolin and 25% of ground chalk; the active manganese content is adjusted to 0.02% calculated on the solids of the coating mix. The finished coating mix contains as binding agent oxidatively degraded starch and a commercial carboxylated styrene-butadiene emulsion of small droplets, known in commerce as "Dow-Latex." The amount of latex which was used was twice that of starch. This mass is admixed with a melamine-formaldehyde precondensate and has a solids content of 40–50%. The mass is applied on a coating machine to one side of a base paper having a low content of mechanical wood (mechanical pulp content below 15%); total drying time 12 seconds. The paper is then calendered on a 14-roller or bowl supercalender, and cut into sheets.

The sheets in the size of 78 x 122 cm., having a relative humidity in the stack of 55%, were printed by the offset process in a four-color printing machine at 6000 prints per hour. No dusting was applied. The printing plate contained partly very heavy areas, i.e. areas with superimposed screen points of all four colors. The color sequence was black-blue-red-yellow. Stacks of more than 5000 sheets were formed without any offsetting or rubbing off taking place.

A commercially available coated paper of high quality, but without manganese salt activation was printed in the same manner for comparison purposes. It was found that unsatisfactory results were obtained in the absence of dusting. The printer ascertained that the manganese activated paper, in accordance with the invention, exhibits within a short period a significantly more rapid drying of the printing ink than does the paper lacking the manganese salt activation. The abrasion resistance of the print on the inventive paper was also superior to that of the print on the commercially available prior art paper. The abrasion tests were carried out in a customary abrasion testing device.

EXAMPLE 3

This test was performed with a conventional pigment coating mix consisting of about 40% clay as it is commercially available for pigment coating purposes
20% of satin-white
20% of precipitated chalk
12% of a synthetic binder (styrene-butadiene copolymer marketed by Dow-Chemical Europe S.A.), and
8% of casein in the form of caseinate.

One part of modified calcium stearate per 100 parts of the above conventional coating mix were incorporated into the mix. The modification of the calcium stearate was accomplished thereby that 5 molar percent of calcium—added in the form of calcium cholride—were replaced by cobalt—added in the form of cobalt sulfate. The calcium stearate acted as surface active agent.

Base paper of a substance of 60 g., suitable for coating purposes, was coated on both sides with 25 g. per square meter of the above coating mass and was subsequently dried. The indicated amount of 25 g. per square meter relates to the dry weight of the mass. The coated paper web, which was calendered to impart it with a high gloss, was thereafter printed on both sides in four colors on a web offset press. The printing speed was 18,000 prints per hour. The printed paper was folded and cut in the press. For comparison purpose, printing was effected on commercially available high quality coated paper devoid of the inventive activating catalysts in dispersed form. Undesired smudging and smearing of heavily printed areas onto unprinted areas which frequently occurs in stacking did not take place in the experiment with this activated paper. The activation of the paper, however, does in no way affect the desired gloss and the superior abrasion resistance of the final print.

The invention is applicable to any kind of printable material, such as paper, carton, cardboard and foils of various kinds and is, as has previously been set forth, particularly suitably carried out with pigment coated printable material. The pigment coats may be admixed with any substance which has a drying promoting effect on the printing ink or color applied to the coating. It should be pointed out in this connection that it is sufficient if a component of the drying promoting substance is incorporated in the surface to be printed, while another component of the substance is then present in the printing ink proper. Further, combination of such substances or components may be employed.

In a preferred embodiment of the invention the substance in question is present in the printable material in a non-polar medium in an oily phase.

With respect to coating mixes to be used for coating printable material, the customary compositions for such mixes may be used. It has been shown to be advantageous if in the presently used metal soaps, for example stearates, highly drying active compounds are incorporated or built in. For example, instead of a customary calcium stearate, a calcium-manganese stearate may be used as indicated in Example 3.

The drying process, which is of chemical nature, is initiated when the contact between printing ink and activated printable material takes place. This means that the printing ink may be simplified in respect to its composition since accelerators and inhibitors need no longer be added in measured amounts.

Other properties of the printing ink may thus be considered to a greater extent than has been previously possible, such properties being, for example, stability, fluidity, affinity to the printable material, color intensity, chemical properties and the like.

If a printing ink is used which does not contain drying catalysts, then no danger exists that the printing ink will start to solidify when the operation of the printing machine is temporarily interrupted. On the other hand, the activity and effect of the drying promoting catalytic substances, which are incorporated in the printable material, can be amplified, supplemented and complemented by metallo-organic salts which may be present in the printing ink. In this manner a total effect may sometimes be obtained which is in the nature of a synergistic effect and which could not be obtained by incorporating the catalysts either in the printable material alone or only into the printing ink.

The invention is particularly advantageously carried out on printable material which has been improved by several pigment coatings. In respect to such coated papers, the active, drying promoting substance can be concentrated in the uppermost layer or layers. Due to the particularly pronounced smoothness and microporous structure of the pigment coating, such papers can be printed with thin colorprint films while obtaining extraordinary print qualities. Such films are particularly suitable for rapid and complete drying.

However, as has previously been set forth, the invention is not limited to use on pigment coated printable materials. The invention can also be employed in respect to uncoated papers and in such event the catalytic substances are either admixed with the fibrous paper material during the paper manufacture or are added to the surface size which is used in the paper manufacture. Thus, for example, the substances may be added to the machine vat before the paper mass enters the paper making machine or they may be incorporated into the liquid formulation that is applied to the paper at the size press of the paper machine.

It will also be appreciated that the invention is not limited to any particular printing procedure but it can be used in any kind of printing process.

The various features of novelty which characterize the invention are pointed out with particularity in the claims annexed to and forming a part of this specification. For a better understanding of the invention, its operating advantages and specific objects attained by its uses, reference should be had to the accompanying drawings and descriptive matter in which there is illustrated a preferred embodiment of the invention.

BRIEF DESCRIPTION OF THE DRAWINGS

In the drawings:
FIG. 1 is a perspective view of a coated paper on enlarged scale of which the top coat contains the inventive catalysts; and
FIG. 2 is a diagrammatic cross-sectional fragmentary showing on enlarged scale of the structure of cellulosic paper having incorporated therein an inventive catalyst. The legends on the drawings are self-explanatory.

What is claimed is:
1. Printable material comprising a paper base, a pigment coating on said paper base and a catalytic substance effective to promote the drying of printing ink after the printing ink has been applied to said pigment coating, said substance being incorporated within said pigment coating in discontinuous, finely dispersed form and being a metal salt of a higher organic acid or a normally stable peroxide.

2. Printable material as claimed in claim 1, wherein said substance is incorporated within said pigment coating in the form of an oily dispersion forming a separate phase.

3. Printable material as claimed in claim 1, wherein said pigment coating comprises several layers, said substance being incorporated within the outermost layer.

4. Printable paper material having incorporated therein a catalytic substance capable of promoting the drying of the printing ink after the ink has been applied to said material, said substance being a metal salt of a higher organic acid or a normally stable peroxide and being present in said material in discontinuous, finely dispersed form.

5. The material as claimed in claim 4, wherein said substance is incorporated in the material in the form of an oily dispersion.

6. In a method of improving the printability of pigment coatings to be applied to printable paper material, wherein the surface of the coating to be printed is provided with a catalytic substance in the form of a metal salt of a higher organic acid or a normally stable peroxide which promotes the drying of printing ink, the improvement which comprises admixing the catalytic substance with an aqueous pigment coating mix in the form of an oily dispersion forming a separate dispersed phase in the mix.

7. The improvement of claim 6, wherein the admixture is carried out in the presence of a surface active agent.

8. The improvement of claim 7, wherein said mix contains binder material, said binder material being capable of forming protective colloids around the particles of said dispersion.

9. The improvement of claim 6, wherein said catalytic substance is admixed with said mix in the presence of an organic solvent.

References Cited

UNITED STATES PATENTS

| | | | |
|---|---|---|---|
| 3,029,154 | 4/1962 | Kapral | 117—154 X |
| 3,138,477 | 6/1964 | Torstenson | 117—154 X |
| 3,413,139 | 11/1968 | Rasmussen et al. | 117—76 P X |
| 3,463,661 | 8/1969 | Benson | 117—76 P |
| 3,519,466 | 7/1970 | Akamatsu | 117—38 |

RALPH HUSACK, Primary Examiner

U.S. Cl. X.R.

117—15, 60, 68, 90, 152, 154, 167; 162—134, 158, 179